United States Patent [19]

Irani

[11] 4,053,561

[45] * Oct. 11, 1977

[54] REMOVAL OF FLUORINE FROM PHOSPHATIC SOLUTIONS

[75] Inventor: Mazin R. Irani, Tarrytown, N.Y.

[73] Assignee: Stauffer Chemical Company, Westport, Conn.

[*] Notice: The portion of the term of this patent subsequent to Nov. 23, 1992, has been disclaimed.

[21] Appl. No.: 604,572

[22] Filed: Aug. 14, 1975

[51] Int. Cl.$^2$ .................. C01B 15/16; C01B 25/26; C01B 25/16

[52] U.S. Cl. .................. 423/313; 423/309; 423/321 R

[58] Field of Search .......... 423/305, 307–313, 423/321, 321 S, 490; 204/180 P

[56] References Cited

U.S. PATENT DOCUMENTS

| | | | |
|---|---|---|---|
| 2,044,940 | 6/1936 | Haag | 423/321 |
| 3,645,682 | 2/1972 | Cochran | 423/321 |
| 3,872,215 | 3/1975 | Cherdron et al. | 423/309 |
| 3,937,783 | 2/1976 | Wamser et al. | 423/321 S |

FOREIGN PATENT DOCUMENTS

| | | | |
|---|---|---|---|
| 1,284,404 | 12/1968 | Germany | 423/321 |
| 467,843 | 6/1937 | United Kingdom | 423/321 |
| 1,024,924 | 4/1966 | United Kingdom | 423/321 |

OTHER PUBLICATIONS

Ionics Bulletin, L–2, 1963, p. 3.

*Primary Examiner*—O. R. Vertiz
*Assistant Examiner*—Gregory A. Heller
*Attorney, Agent, or Firm*—Charles B. Rodman; Roger S. Benjamin

[57] ABSTRACT

A method for removing fluoride ions from phosphoric acid by neutralizing said acid to a pH between about 5 and about 9, contacting the neutral salt solution thereby formed with an insoluble alkaline earth metal phosphate salt, and lowering the pH to convert the solution back to a purified acid.

16 Claims, No Drawings

REMOVAL OF FLUORINE FROM PHOSPHATIC SOLUTIONS

BACKGROUND OF THE INVENTION

The present invention relates to a method for removing fluorine from phosphatic materials. More particularly, this invention is concerned with the removal of fluorine in the form of fluoride ions from a crude phosphoric acid which has been converted to an inorganic phosphate salt solution to conveniently remove the fluorine, and then reconversion of the phosphate salt solution to a purified phosphoric acid.

The manufacture of phosphoric acid has generally been accomplished by two methods. One method is called the "electric furnace" or "thermal method", and the other method of manufacture is called the "wet process" method. Both methods of manufacture are well known in the art and described, for example, in Waggaman "Phosphoric Acid, Phosphates and Phosphatic Fertilizers", Second Edition, at pages 158 to 210, Hafner Publishing Company (1969), and also in Slack, "Phosphoric Acid", Volume 1, Part 1, at pages 5 to 54, Marcel Dekker, Inc. (1968).

Phosphoric acid manufactured by the "electric furnace" or the "thermal acid" method, or by the "wet process" method, contains fluorine largely in the form of hydrogen fluoride, fluosilicic acid or fluosilicates.

When the presence of sodium salts is not objectionable in the final product, some fluorine can be precipitated and filtered off as sodium fluosilicate by the addition of an amount of sodium carbonate sufficient to convert 50 of 75% of the acid into monosodium phosphate. However, the amount of fluorine remaining is in excess of food grade requirements.

U.S. Pat. No. 1,329,273 to Ross discloses a process for removing fluorine from phosphoric acid by the addition of either calcium chloride or sodium phosphate or both salts.

U.S. Pat. No. 2,123,785, discloses the removal of fluorine by filtering the impure phosphoric acid through beds of hydrated silica.

U.S. Pat. No. 2,132,349, to Booth et al suggests the absorption of fluorine compounds by passing concentrated phosphoric acid through a column of skeletal silica.

U.S. Pat. No. 2,169,100 to Hettrick, proposes reducing the fluorine content of concentrated phosphoric acid by blowing superheated steam through it at a temperature of 280° F.

The above prior art methods for removing fluorine from phosphoric acid produced in any desired manner are generally characterized by treating the crude acid in the acid form for removal of fluorine and other impurities.

U.S. Pat. Nos. 2,262,745 and 2,417,462, disclose the use of tricalcium phosphate and trimagnesium phosphate for removing fluorine from drinking water. Additionally, an article by Adler, "Removal of Fluorine from Potable Water by Tricalcium Phosphate" in Volume 30 of Industrial & Engineering Chemistry, at pages 163–165 (Feb. 1938), also offers data on fluorine removal from drinking water. It has been found that the technology dealing with removal of fluorine from drinking water by using alkaline earth metal phosphates accomplishes, after certain modifications have been made, a more efficient removal of fluorine from phosphoric acid.

SUMMARY OF THE INVENTION

This invention relates to improvements in fluorine removal from crude phosphoric acid. More particularly, this invention is concerned with the removal of fluorine from a crude phosphoric acid which has already had a preliminary treatment to lower the fluorine content, but where the fluorine content does not comply with the requirements for a food grade phosphoric acid.

It has been discovered that the refining of phosphoric acid can be accomplished more simply, more efficiently, and more economically by utilizing a purifying operation involving a sequence of steps including the conversion of crude phosphoric acid to a solution of inorganic salts of phosphoric acid, removal of the fluorine, and ultimate reconversion of the salts back to a phosphoric acid of enhanced purity. The lowered fluorine content of the purified acid complies with food grade requirements.

DESCRIPTION OF THE PREFERRED EMBODIMENTS

In accordance with the present invention, a crude phosphoric acid is neutralized to a pH between about 5 and about 9. The phosphate salt solution is then contacted with an insoluble alkaline earth metal phosphate salt having a alkaline earth metal to phosphorus mole ratio of from about 1.4:1 to about 1.8:1 The resulting phosphate salt solution has a high degree of purity with regard to the fluorine content. The phosphate salt solution can then be used for its own application such as a food additive, or alternatively, can be converted back to a phosphoric acid of enhanced purity. Reconverting the phosphate salts to a more purified phosphoric acid can be accomplished by means of contacting with a mineral acid, such as $H_2SO_4$, or by ion exchange, such as with a $H+$ loaded ion exchange resin, or by electrodialysis.

The present invention is especially effective in those instances where crude phosphoric acid has a relatively low level of fluorine content, but must be further treated to reduce the fluorine level in order to qualify the acid for food grade or pharmaceutical applications.

Although prior art methods have been able to achieve reduction of the fluorine content in phosphoric acid, it has been found that further reduction of the fluorine content to food grade levels becomes increasingly difficult as lower levels of fluorine content are sought. Therefore, the method of the present invention is especially suitable for producing phosphoric acid and phosphatic materials having a fluorine content complying with food grade standards, in a simplified and economical manner.

Food grade phosphoric acid must not exceed 10 ppm of fluorine, whereas, the alkali orthophosphate salts complying with food grade requirements must not exceed 50 ppm. These standards appear in the 2nd Edition of "Food Chemicals Codex", published by the National Academy of Sciences, Washington, D.C. (1972). The "Food Chemicals Codex" has been given official recognition by the Food and Drug Administration as setting industry-wide standards for food grade chemicals.

For best operation of the present invention, it is comtemplated that the crude phosphoric acid will have a fluorine content varying from about 150 ppm to about 10 ppm, preferably from about 100 ppm to about 10 ppm and most preferably from about 50 ppm to about 10 ppm.

The neutralization of the crude phosphoric acid to a pH between about 5 and about 9, preferably about 6 to about 8, can be accomplished by contacting the crude phosphoric acid with an alkaline reagent. Suitable alkaline reagents are ammonia, and the carbonates, bicarbonates and hydroxides of sodium, potassium and ammonia. Anion mixtures of the individual alkali cations can also be used. The alkali phosphate solution can be a mixture of mono- and dialkali phosphates, with their existence and ratio dependent upon the particular pH reached. For example, when an alkali such as sodium carbonate, sodium hydroxide, or mixtures thereof is used to reach a pH of 6.55 at an original $P_2O_5$ concentration of 25%, this will result in a molar ratio of mono-to disodium phosphate of about 1:2.

Alternatively, the crude phosphoric acid can be neutralized to the proper pH by contacting it with a sodium, potassium, or ammonium-loaded ion exchange resin to raise the pH to form a solution of alkali phosphate salts.

The alkali phosphate salt solution is then contacted with an insoluble alkaline earth metal phosphate salt having an alkaline earth metal to phosphorus mole ratio of about 1.4:1 to about 1.8:1. The preferred alkaline earth metals are calcium and magnesium, with calcium being particularly preferred.

Flow rates and contact times depend upon the amount of fluorine present in the solution and the level of fluorine desired in the product. For example, about 10 to about 150 parts per million of fluorine will require about 1 to about 50% tricalcium phosphate, by weight, with about 5 to about 20% tricalcium phosphate being preferred. Contacting times can last for about 1 to about 100 minutes, with about 5 to about 30 minutes being preferred.

The alkali phosphate salt solution after contact with the alkaline earth metal phosphate has a fluorine level suitable for food grade requirements. The alkali phosphate salt solution with its lowered fluorine content can be reconverted to purified phosphoric acid having a fluorine content complying with food grade standards. The reconversion can be effected by contacting the alkali phosphate salt solution with a hydrogen ion loaded ion exchange resin to convert the alkali phosphates back to phosphoric acid, or by means of electrodialysis, or with mineral acids such as sulfuric acid. Hydrochloric acid or nitric acid can also be used, however, these acids form soluble chlorides and nitrates which become impurities and are more difficult to separate than the sulfates which form when using sulfuric acid. Excess sulfates can be easily removed by precipitation with, for example, barium compounds, such as barium hydroxide.

The alkaline earth metal phosphates, after being used to remove the fluoride ions, can be separated from the dissolved alkali phosphate solution by any convenient means, such as screening, filtration, centrifugation and other equivalent means. The separated alkaline earth metal phosphates can be conveniently regenerated by contacting with a dilute caustic solution, such as 5% NaOH for about ½ hour, separated from the caustic by screening, filtration or centrifugation, and suspended in water. A sufficient amount of an acid is added to the suspension to reach a pH of 7. Acids such as Hcl, $H_2SO_4$, $H_3PO_4$ and $HNO_3$ can be conveniently used. For best results, the acids are usually diluted to a concentration of about 5% to about 10%. The neutral suspension of alkaline earth metal phosphate is separated, worked with water, and is ready for reuse.

The alkaline earth metal phosphates contemplated for use in the present invention include calcium and magnesium phosphates, and mixtures thereof. The calcium phosphates are most preferable and include hydroxy apatite, tricalcium phosphate and mixtures thereof. The analagous magnesium phosphate salts can also be used, and mixtures of both calcium and magnesium salts also function.

Commercial tricalcium phosphate, as prepared by the addition of phosphoric acid to a slurry of hydrated lime, consists mostly of the amorphous form of hydroxy apatite $Ca_5(PO_4)_3OH$. There is, however, a true tricalcium phosphate $Ca_3(PO_4)_2$. The $\beta$-form occurs in nature as the mineral whitlockite and contains 6.8 atom % magnesium. Synthetically, it may be prepared by the reaction of a water solution of $Ca(NO_3)_2$ with that of $Na_2HPO_4$ in the presence of $Mg++$ or $Mn++$ as stabilizer. The $\beta$-$Ca_3(PO_4)_2$, when heated, undergoes the following progression:

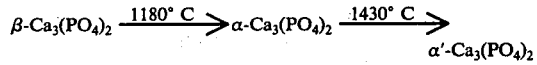

Hydroxy apatite is generally represented by the formula $Ca_5(PO_4)_3OH$. However, by variations in the methods of synthesis, compounds having a Ca/P mole ratio of from 1.41 to 1.75 as shown in the table below are obtained, which all have nearly the same X-ray patterns.

| CALCIUM HYDROXY APATITE[1] | |
|---|---|
| Mole ratio Ca/P | Method of preparation |
| 1.41 | Dilute $CaCl_2$ plus excess of dilute $Na_2HPO_4$ at 25° C |
| 1.50 | $Ca(OH)_2$ added to $H_3PO_4$ to phenolthalein end point or by slow hydrolysis of $CaHPO_4 \cdot 2H_2O$ (gets good crystals) |
| 1.61 | $Ca(OH)_2$ added to dilute $H_3PO_4$ to phenolthalein point and then boiled. |
| 1.67 | $Ca(OH)_2$ added to dilute $H_3PO_4$ then neutralized at boiling. |
| 1.75 | Freshly precipitated "tricalcium phosphate" plus lime. |

[1]Shen and Callis, "Preparative Inorganic Reactions", Vol. 2 pp 148-153 (Interscience 1965).

Another method for the preparation of $Ca_5(PO_4)_3OH$ involves the use of an aqueous $NH_4OH$ solution to maintain a sufficiently high pH (pH = 12). Under high pH conditions, the $PO_4^{3-}$ concentration is not exceeded by that of $HPO_4^{2-}$ and thus avoids the formation of $Ca_8H_2(PO_4)_6 \cdot 5H_2O$. The reaction is shown in the following equation:

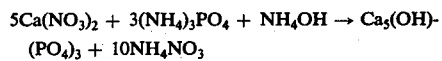

The precipitate obtained is heated to 800° C. It shows a structure corresponding to hexagonal prisms which terminate in pyramids.

The following examples more particularly illustrate the invention. All parts and percentages are by weight unless otherwise noted.

EXAMPLE 1

Preparation of Tricalcium Phosphate 1,000 ml. of distilled water were placed in a 2 liter Erlenmeyer flask. 243 gms. of calcium oxide were added with stirring. A great amount of heat accompanied the formation of calcium hydroxide. 500 gms of 85% $H_3PO_4$ were added slowly. Heat was also evolved. The suspension was stirred for ½ hour and then allowed to settle. The white tricalcium phosphate formed was filtered and placed in an oven at 100° C. overnight to dry.

EXAMPLE 2

A 1,000 gram sample of a wet process acid produced from calcined North Carolina rock containing 54% $P_2O_5$ and having a fluorine content of 3800 ppm was subjected to a purification treatment involving the following steps:

1. Extraction of the wet process acid with isoamyl alcohol at a ratio of alcohol-to-acid of 2 to 1 by weight;
2. Separation of the raffinate;
3. Partial neutralization of the organic acid extract by the addition of 50% NaOH solution to the organic layer in an amount sufficient to neutralize 7% of the available hydrogen ions;
4. Separation of the residue;
5. Stripping the organic acid phase with water to produce an aqueous acidic phase and an organic alcohol phase;
6. Separation of the aqueous acidic phase;
7. Passage of the aqueous acidic phase through a 2 ft. × 2 in. activated carbon column at a flow rate of 50 milliliters per minute;
8. Neutralization of the acid to a pH of 6.61 with $Na_2CO_3$, thereby producing a mixed sodium salt solution with a ratio of sodium to phosphorus of 5 to 3 or a molar ratio of 1 to 2 of $NaH_2PO_4$ and $Na_2HPO_4$;
9. Filtering any formed precipitates;
10. Passing the mixed sodium salt solution over an activated carbon column as in step 7 thereby producing a water white solution of mixed sodium phosphates which contain 24% $P_2O_5$ and a fluorine content of 21 parts per million. The solution had a pH of 6.58 and consisted of 15.1% monosodium hydrogen phosphate and 35.7% disodium hydrogen phosphate.

Four 50 ml aliquots were separated from the above solution and were respectively contacted with 2.5 grams, 5 grams, 7.5 grams and 10 grams of tricalcium phosphate $Ca_{10}(PO_4)_6(OH_2)$. Each 50 ml sample was stirred for 15 minutes, filtered, and its fluoride ion content determined by the fluorine specific ion electrode method as described in Orion Research Company's "Analytical Methods Guide" 6th Edition (1973). The results are tabulated below:

| Grams of Tricalcium Phosphate per 50 ml. | Concentration of Tricalcium Phosphate in Percent. | F$^-$ (ppm) |
| --- | --- | --- |
| 0 | 0 | 21.0 |
| 2.5 | 5 | 3.4 |
| 5 | 10 | 3.0 |
| 7.5 | 15 | 2.7 |
| 10 | 20 | 2.1 |

EXAMPLE 3

Five 50 ml samples of wet process phosphoric acid produced from uncalcined Florida rock were neutralized in a manner similar to that of Example 2, giving a mixed sodium phosphate solution having a $P_2O_5$ content of 20.2% and a fluoride ion content of 29 parts per million. The five samples were contacted with 5, 10, 20, 30, and 50 grams of tricalcium phosphate, respectively. Each sample was stirred for 20 minutes. The samples were then filtered and the filtrate analyzed, with the results tabulated in the table below:

| Sample | Tricalcium Phosphate (Grams) | F$^-$(ppm) |
| --- | --- | --- |
| 1 | 5 | 4.5 |
| 2 | 10 | 4.3 |
| 3 | 20 | 2.1 |
| 4 | 30 | 0.32 |
| 5 | 50 | 0.19 |

EXAMPLE 4

A neutralized wet process phosphoric acid produced from calcined North Carolina rock, received a similar pretreatment purification as recited in Example 2, resulting in a mixed sodium phosphate solution having a $P_2O_5$ content of 21% and a fluoride ion content of 31 parts per million. Five 50 ml samples of the acid were prepared. Each sample of acid was contacted with a different amount of tricalcium phosphate, the amounts being 5, 10, 20, 30, and 50 grams, respectively. Each sample was then stirred for 20 minutes, filtered and the results tabulated in the table below:

| Sample | Tricalcium Phosphate (grams) | F$^-$(ppm) |
| --- | --- | --- |
| 6 | 5 | 6.0 |
| 7 | 10 | 6.0 |
| 8 | 20 | 4.2 |
| 9 | 30 | 1.6 |
| 10 | 50 | 0.29 |

EXAMPLE 5

200 ml. of a wet process phosphoric acid produced from a calcined North Carolina rock was neutralized in accordance with the procedure set forth in Example 2 to produce a mixed sodium phosphate solution, which was then contacted with 100 grams of tricalcium phosphate. The $P_2O_5$ content was 21% and the fluoride ion content measured 31 ppm. At time intervals of 5 minutes, 10 min, 20 min, 30 min, and 50 min, a 40 ml sample was removed, filtered and analyzed for fluorine. The results of the anaylsis appear in the table below:

| Sample | Contact Time (Min) | F$^-$ppm |
| --- | --- | --- |
| 11 | 5 | 1.3 |
| 12 | 10 | 1.2 |
| 13 | 20 | 1.4 |
| 14 | 30 | 1.2 |
| 15 | 50 | 1.3 |

EXAMPLE 6

472.7 grams of $Na_2HPO_4.7H_2O$ were dissolved in 300ml of $H_2O$. The pH was 9.01. 31.3 grams of 85% $H_3PO_4$ were added until the pH was 7.01. The total $P_2O_5$ content of solution was 17.98%. Then, 0.27 grams of NaF were added to the solution.

Four 50 ml aliquots were sampled and contacted with 2.5, 5, 10, and 15 grams of tricalcium phosphate, respectively. The samples were stirred for 15 minutes, filtered and analyzed for fluorine content by the specific ion electrode method. All samples had a pH of 7.01.

Results:

| Sample | Solution | Tricalcium Phosphate (grams) | $F^-$(ppm) |
|---|---|---|---|
| 16 | as is originally | 0 | 0.285 |
| 17 | as is + 0.27 gms NaF | 0 | 152.6 |
| 18 | " | 2.5 | 17.3 |
| 19 | " | 5 | 0.44 |
| 20 | " | 10 | 0.36 |
| 21 | " | 15 | 0.11 |

What is claimed is:

1. A method for removing fluoride ions from phosphoric acid comprising the steps of neutralizing said acid to a pH between about 5 and about 9, separating precipitated impurities, contacting the neutral salt solution thereby formed with an insoluble alkaline earth metal phosphate salt, and separating the neutral salt solution.

2. The method of claim 1 wherein the neutralization of said phosphoric acid is accomplished by contacting said acid with an alkaline reagent selected from the group consisting of ammonia, or compounds whose cations are selected from the group consisting of sodium, potassium and ammonium, and whose anions are selected from the group consisting of carbonate, bicarbonate, hydroxide and mixtures thereof.

3. The method of claim 2 wherein said neutralization is accomplished with a reagent selected from the group consisting of sodium carbonate, sodium bicarbonate, sodium hydroxide, and mixtures thereof.

4. The method of claim 1 wherein said neutralization is accomplished by contacting said acid with an alkali metal loaded ion exchange resin selected from the group consisting of sodium, potassium and ammonium.

5. The method of claim 4 wherein said ion exchange resin is sodium loaded.

6. The method of claim 1 wherein said neutralization is accomplished by means of electrodialysis.

7. The method of claim 1 wherein said alkaline earth metal phosphate salt is selected from the group consisting of calcium, magnesium and mixtures thereof.

8. The method of claim 7 wherein said insoluble alkaline earth metal phosphate salt has an alkaline earth metal to phosphorus mole ratio varying from about 1.4:1 to about 1.8:1

9. The method of claim 7 wherein said alkaline earth metal phosphate is a calcium salt selected from the group consisting of hydroxy apatite, tricalcium phosphate, and mixtures thereof.

10. The method of claim 1 wherein said neutral salt solution is reconverted to phsophoric acid.

11. The method of claim 10 wherein said reconversion is accomplished by contacting the neutral salt solution with a hydrogen ion loaded cation exchange resin.

12. The method of claim 10 wherein said reconversion is accomplished by means of electrodialysis.

13. The method of claim 10 wherein said reconversion is accomplished by contactng with a mineral acid selected from the group consisting of sulfuric, hydrochloric and nitric acids.

14. The method of claim 13 wherein said mineral acid is sulfuric acid.

15. The method of claim 1 wherein the fluorine content of said neutral salt solution after said contacting, complies with food grade requirements.

16. The method of claim 10 wherein the fluorine content of said reconverted acid complies with food grade requirements.

* * * * *

UNITED STATES PATENT OFFICE
CERTIFICATE OF CORRECTION

Patent No. 4,053,561     Dated October 11, 1977

Inventor(s) Mazin R. Irani et al.

It is certified that error appears in the above-identified patent and that said Letters Patent are hereby corrected as shown below:

The portion of the term of this patent subsequent to November 23, 1993, has been disclaimed.

*Signed and Sealed this*

*Thirteenth* Day of *December 1977*

[SEAL]

*Attest:*

RUTH C. MASON
*Attesting Officer*

LUTRELLE F. PARKER
*Acting Commissioner of Patents and Trademarks*